United States Patent [19]
Uejo et al.

[11] Patent Number: 4,749,744
[45] Date of Patent: Jun. 7, 1988

[54] RESIN COMPOSITION OF SAPONIFIED ETHYLENIC COPOLYMER

[75] Inventors: Hirozo Uejo; Kenji Shimizu; Kazunobu Sano, all of Ube, Japan

[73] Assignee: Ube Industries, Ltd., Ube, Japan

[21] Appl. No.: 883,078

[22] Filed: Jul. 8, 1986

[30] Foreign Application Priority Data

Jul. 12, 1985 [JP] Japan ............................ 60-152299
Apr. 25, 1986 [JP] Japan ............................ 61-94854

[51] Int. Cl.$^4$ ..................... C08L 29/04; C08L 77/00
[52] U.S. Cl. ..................................... 525/58; 525/184
[58] Field of Search ............................. 525/58, 184

[56] References Cited

U.S. PATENT DOCUMENTS 3,636,136  1/1972  Konopik ........................ 525/58
4,347,332  8/1982  Odorzynski et al. ........... 525/58
4,427,825  1/1984  Degrassi et al. ................ 525/58

Primary Examiner—Lewis T. Jacobs
Assistant Examiner—A. Carrillo
Attorney, Agent, or Firm—Frishauf, Holtz, Goodman & Woodward

[57] ABSTRACT

A resin composition of a saponified product of an ethylenic copolymer, which comprises 100 parts by weight of a saponified product of a copolymer of ethylene and vinyl acetate having 5 to 50 mol % of recurring units of —CH$_2$—CH$_2$— based on the ethylene monomer and also having a saponification degree of about 80% or more and 5 to 150 parts by weight of a polyamide having a relative viscosity of 2.1 to 3.5 and being subjected to terminal end modification leaving carboxylic end groups of $3 \times 10^{-5}$ equivalent/g or less.

The resin composition of the present invention has the gas barrier property, rigidity and heat resistance, and also is improved in pinhole resistance or impact resistance, and therefore it can be suitably used as packaging materials or functional parts.

11 Claims, No Drawings

RESIN COMPOSITION OF SAPONIFIED ETHYLENIC COPOLYMER

BACKGROUND OF THE INVENTION

This invention relates to a resin composition of a saponified product of an ethylenic copolymer. More particularly, the present invention relates to a resin composition comprising a saponified product of an ethylene-vinyl acetate copolymer which has been saponified to a high degree formulated with a specific polyamide at a specific proportion. The film or vessel molded by extrusion molding from the resin composition of the present invention is excellent in both of gas barrier characteristic and impact resistance (pinhole resistance), and is particularly suitable for use in films or vessels for packaging foods. Also, the molded product molded by injection molding of the resin composition of the present invention is excellent not only in rigidity and heat resistance but also in impact strength, and therefore useful for various functional parts as engineering plastics.

Generally speaking, saponified products of ethylene-vinyl acetate copolymer (hereinafter abbreviated as EVOH) have very good gas barrier property and therefore useful as materials for forming films or vessels for packaging foods for which oxygen gas permeability rate is required to be small. Also, compositions of EVOH formulated particularly with glass fibers have high rigidity and heat resistance, and therefore useful for various kinds of functional parts as substitute for metallic parts (Al die casting, Zn die casting, etc.).

However, the EVOH and its molding have the drawbacks that they are hard and brittle, whereby they are restricted in aspect of uses. For example, when used for films or sheets for packaging foods, the film may be broken or pinholes are liable to be formed during packaging working, moving working of packaged products or transportation working, whereby its excellent gas barrier property cannot fully be utilized. Further, in the case of utilization in injection molded products of EVOH, claims have been frequently aroused for crack generation, etc., immediately after molding and at lower temperatures.

The physical properties and moldability of EVOH will generally vary depending on the ethylene content and saponification degree. As the ethylene content is increased or the saponification degree is smaller, moldability and impact resistance can be improved, while on the contrary gas barrier property, rigidity and heat resistance will be lowered. For this reason, it has been strongly desired to have a novel technology which can improve impact strength without impairing greatly gas barrier characteristic, rigidity and heat resistance which are specific features of EVOH.

As a means for improving such drawbacks of EVOH, there have been known the method in which various kinds of polyamides are mixed with EVOH are used, as disclosed in Japanese Patent Publications Nos. 24277/1969 and 22833/1973, Japanese Unexamined Patent Publications Nos. 121347/1975, 78749/1979, 78750/1979 and 34956/1980.

According to the method as mentioned above, due to good compatibility between EVOH and polyamide, the polyamide can act so as to improve impact resistance by mixing of a polyamide with EVOH, and yet excellent gas barrier property, rigidity and heat resistance inherent in EVOH are not considerably impaired thereby.

However, the resin composition which is a mixture of EVOH and polyamide involves a great problem. That is, when EVOH and polyamide are mixed under molten state, both will undergo chemical reaction to be increased in melt viscosity until finally gelled, whereby molding becomes no longer possible.

Since such gelation becomes more marked as the molding temperature is higher, it has been proposed to use various kinds of copolymeric polyamides with lower melting temperature as the polyamide for the purpose of lower temperature molding, and such methods include those as disclosed in Japanese Unexamined Patent Publications Nos. 78749/1979, 78750/1979 and 34956/1980.

However, even according to these methods, it is difficult to prevent completely gelation and it would be desirable to have a practical method for improving impact resistance of EVOH without impairing molding processability.

SUMMARY OF THE INVENTION

The present inventors have studied intensively in order to improve such impact resistance of EVOH and consequently found that a resin composition comprising a specific EVOH mixed with a polyamide applied with specific modification of end groups will be hardly gelled during molding thereof and can give a molded product which is improved in pinhole resistance or impact resistance without impairment of gas barrier property, rigidity and heat resistance of the molded product, to accomplish the present invention.

More specifically, the present invention concerns a resin composition of a saponified product of an ethylenic copolymer, comprising 100 parts by weight of a saponified product of a copolymer of ethylene and vinyl acetate having 5 to 50 mol % of recurring units ($-CH_2-CH_2-$) based on the ethylene monomer and also having a saponification degree of about 80% or more and 5 to 150 parts by weight of a polyamide having a relative viscosity of 2.1 to 3.5 and being subjected to terminal end modification wherein carboxylic end groups have been modified by monoamine or diamine so that the amount of the carboxylic end groups is $3 \times 10^{-5}$ equivalent/g or less.

The resin composition of the present invention has the following advantages:
(a) during molding of films, vessels, injection moldings, etc., there will occur no gelling or other trouble which will make molding difficult; and besides,
(b) its molded product has satisfactory gas barrier property, rigidity and heat resistance, and also is improved in pinhole resistance or impact resistance, and therefore it can be suitably used as packaging materials or functional parts.

DETAILED DESCRIPTION OF THE INVENTION

The saponified product of a copolymer of ethylene and vinyl acetate to be used in the present invention (EVOH) is a "saponified product of ethylene-vinyl acetate copolymer" having the recurring units based on ethylene monomer (hereinafter referred to as a recurring unit I) at a proportion of 5 to 50 mol %, preferably 10 to 45 mol %, particularly preferably 15 to 40 mol % based on the total amount of the polymer, and also having a saponification degree of about 80% or higher, preferably 90% or higher, particularly preferably 95% or higher.

The above saponified product (EVOH) is prepared by saponification of an ethylene-vinyl acetate copolymer obtained by polymerization of ethylene monomer with vinyl acetate monomer according to the known method. If the above recurring units I based on ethylene monomer is less than 5 mol % of the saponified product, such a saponified product is not suitable because the resin composition obtained by use thereof will be worsened in moldability. On the other hand, if the above recurring units I based on ethylene monomer is contained at a proportion of more than 50 mol %, such a saponified product is not suitable because the molded product molded from the resin composition formulated with such a saponified product will be worsened in gas barrier property, rigidity and heat resistance.

In the present invention, there is no particular limitation with respect to polymerization degree, etc., of EVOH, but it is preferable to use EVOH having an intrinsic viscosity of 0.07 to 0.17 (as measured in 15 wt. % water-containing phenol, at 30° C.).

The polyamide useful in the present invention may include nylon 6, nylon 610, nylon 12, etc. Particularly, with respect to compatibility with EVOH and lowering of molding temperature, it is preferable to use a copolymer based on nylon 6 such as nylon 6/66 copolymer, nylon 6/12 copolymer, nylon 66/610/6 copolymer and the like. The specific feature of the present invention resides in use of a polyamide subjected to specific modification of end groups and it is required that there should exist $3 \times 10^{-5}$ equivalent/g or less of carboxylic end groups. When a polyamide which does not satisfy such a condition of end groups is used and formulated with EVOH, the composition will be increased in melt viscosity during molding, whereby it becomes difficult to perform continuous molding over a long time. For obtaining a polyamide having such terminal groups, known methods can be applied. For example, it can be obtained by adding an amine during polymerization. It is preferable to use a monoamine such as an aliphatic monoamine (e.g. laurylamine) or an aromatic monoamine (e.g. methylbenzylamine) and a diamine such as an aliphatic diamine (e.g. hexamethylenediamine) or an aromatic diamine (e.g. m-xylenediamine).

The polyamide to be used in the present invention should preferably have a polymerization degree corresponding to relative viscosity within the range from 2.1 to 3.5, more preferably from 2.2 to 3.2.

For making end groups as in the present invention, a polyamide with a relative viscosity higher than 3.5 can be polymerized with difficulty. On the other hand, if the relative viscosity is lower than 2.1, no improvement of pinhole resistance or impact resistance intended by the present invention can be accomplished when formulated with EVOH.

The resin composition of the present invention is a resin composition of a saponified product of ethylenic copolymer containing 100 parts by weight of EVOH as described above and 5 to 150 parts by weight, preferablty 10 to 100 parts by weight, of the polyamide as described above as polymeric components.

In the resin composition of the present invention, if the proportion of the polyamide used relative to the saponified product (EVOH) is lower than 5, mechanical properties such as pinhole resistance or impact resistance of the molded producted formed from such a resin composition will remain inferior as before without improvement. On the other hand, if the proportion of the polyamide used relative to the saponified product (EVOH) is greater than 150, the gas barrier property, rigidity, etc., of the molded product formed from such a resin composition will be undesirably insufficient.

The method for preparation of the resin composition of the present invention is not particularly limited but it can be practiced according to "the method of mixing the saponified product and the polyamide as described above" which is a conventional known method.

More specifically, as the known method of mixing of the saponified product with the polyamide as described above, for example, the saponified product and the polyamide as described above may be blended uniformly under the state of pellets or powder, subsequently melting and kneading the blend through an extruder to be formed into pellets, which pellets are used for molding. Alternatively, pellets or powder of the saponified product and the polyamide as described above are blended uniformly and the resultant blend is directly fed into a film forming machine or an injection molding machine and molding is effected while kneading the mixture within the molding machine.

For forming the resin composition of the present invention into films, vessels, injection molded articles, etc., conventional extrusion molding methods, injection molding methods may be applicable, and stable continuous molding is possible in such molding methods without generation of gelled product over long time.

The film, sheet, etc., comprising the resin composition of the present invention is excellent in gas barrier property and pinhole resistance, while retaining transparency and chemical resistance, and therefore is of high utilization value. Further, the injection molded article comprising the resin composition of the present invention is excellent in rigidity, heat resistance and impact resistance, while being also excellent in abrasion resistance and chemical resistance, and therefore useful for various functional parts as engineering.plastics.

The resin composition of the present invention is also inclusive of those in which other components such as pigments, heat stabilizers, antioxidants, weathering resistant agents, crystallization promotors, lubricants, fillers, plasticizers, etc., are added in appropriate amounts. Particularly, those filled with glass fibers are useful as injection molded articles due to high rigidity, creep resistance and heat resistance.

The present invention is described in more detail by referring to the following Examples and Comparative Examples. The physical properties of the films in Examples or Comparative Examples were measured according to the methods as described below.

(1) Oxygen permeability:

Measured by means of an oxygen gas permeability measuring device (OXYTRAN-Model 100, produced by Modern Control Co.) under the conditions of 20° C. and absolutely dry state.

(2) Pinhole resistance:

Tensile test in the take-up direction (M.D.) was conducted according to ASTM D-882 at 23° C. under absolutely dry state. The tensile modulus and elongation were used as the measure of pinhole resistance. That is, in the above test, as the tensile modulus is lower or as the elongation is greater, pinhole resistance is evaluated to be better.

(3) Viscosity increase gelling characteristic:

(a) EVOH and terminal-modified polyamide were melted and kneaded through a single screw extruder to form pellets of the resin composition of the present invention, which pellets were filled into a glass tube while under sealing with nitrogen gas. Then, the pellets were subjected to melting and heating treatment in an oil bath of 250° C. for a predetermined time (about 6 hours) and the melt viscosity of the pellets was measured by means of capillary rheometer under the conditions shown below:

measuring temperature; 250° C.,
measuring shearing rate; 100 sec$^{-1}$.

The value of the ratio ($\eta_6/\eta$) of the viscosity $\eta_6$ after heat treatment for 6 hours to the melt viscosity $\eta$ of the oil bath-untreated material thus measured was determined as the gelling degree.

(b) As for gelling behaviors during film molding, it was judged from the time before generation of a gelled product after extrusion molding at a molding temperature of 250° C.

The viscosity increase gelling characteristic were evaluated from the above (a) and (b).

(4) Relative viscosities in Examples and Comparative Examples were measured according to the method of JISK-6810, and the amino end groups and carboxy end groups according to the method of Waltz [J.E. Anal Chem 19, 448 (1947)]. Amino end groups were determined by dissolving a sample in phenol-methanol mixed solution and carrying out neutral titration with N/20-HCl using Methyl Orange Xylenecyanol FF indicator, and carboxy end groups by dissolving a sample in hot benzyl alcohol and carrying out neutral titration with N/20-NaOH aqueous solution using Phenolphthalein indicator.

EXAMPLE 1

A blend obtained by blending pellets of 100 parts by weight of a "saponified product of ethylene-vinyl acetate copolymer (EVOH)" containing 38 mol % of the recurring units I based on ethylene monomer, and having a saponification degree of 99%, an intrinsic viscosity of 0.14 and a melting point of 173° C. and pellets of 43 parts by weight of a nylon 6(A) subjected to modification of end groups by m-xylenediamine having a relative viscosity of 2.7 with amino end groups of $9.7 \times 10^{-5}$ equivalent/g and carboxylic end groups of $2.0 \times 10^{-5}$ equivalent/g was fed into an extruder (T-die extruder, screw diameter=40 mm) and extruded by melting at 250° C. to extrude a film of a resin composition comprising the polymer components of the above EVOH and the nylon 6(A). Then, the extruded film was solidified by cooling on a casting drum with a surface temperature of 70° C. to mold a film with a thickness of about 50µ. For this film, evaluations of physical properties (1), (2) and (4) mentioned above were conducted.

Concerning gelling behaviors during molding, a severe condition was selected for gelling with a molding temperature of 250° C. and the time before generation of gel in the film was measured.

These results are shown in Table 1.

The resin composition employed in the film preparation as described above was found to be molded without generation of gelled products even after ten hours' molding even by high temperature molding at 250° C. Also, the film obtained by the film preparation as described above was found to be remarkably improved in pinhole resistance and also good in gas barrier property.

EXAMPLE 2

A film was molded in the same manner as Example 1 except for using 43 parts by weight of a nylon 6/66 copolymer (A) subjected to modification of end groups by m-xylenediamine [having a weight ratio of constituent units of nylon 6 to constituent units of nylon 66 (6/66) of 85/15, a melting point of 195° C. and a relative viscosity of 2.8, with amino end groups of $9.0 \times 10^{-5}$ equivalent/g and carboxylic end groups of $2.2 \times 10^{-5}$ equivalent/g] in place of the nylon 6(A).

The results are shown in Table 1.

The film obtained was found to be good in both gas barrier property and pinhole resistance, and further without generation of gelled product during film preparation.

EXAMPLE 3

A film was prepared in the same manner as Example 2 except for changing the amounts of the nylon 6/66 copolymer (A) in Example 2 to 11 parts by weight.

EXAMPLE 4

A film was prepared in the same manner as Example 2 except for changing the amounts of the nylon 6/66 copolymer (A) in Example 2 to 100 parts by weight.

The results of these Examples are shown in Table 1, and good results could be obtained for both Example 3 and Example 4.

EXAMPLE 5

A film was molded in the same manner as Example 1 except for using 43 parts by weight of a nylon 6/12 copolymer (A) subjected to modification of end groups by m-xylenediamine [having a weight ratio of constituent units of nylon 6 to constituent units of nylon 12 (6/12) of 80/20, a melting point of 196° C. and a relative viscosity of 2.5, with amino end groups of $10.5 \times 10^{-5}$ equivalent/g and carboxylic end groups of $2.1 \times 10^{-5}$ equivalent/g] in place of the nylon 6(A).

The results are shown in Table 1.

The film obtained was found to be good in both gas barrier property and pinhole resistance, and no gelled product was generated even after ten hours' molding.

COMPARATIVE EXAMPLE 1

A film was molded in the same manner as Example 1 except for using no polyamide at all. The results are shown in Table 1.

The film obtained as described above was good in gas barrier property, but inferior in pinhole resistance because it is rigid and small in elongation.

COMPARATIVE EXAMPLE 2

A film was molded in the same manner as Example 1 except for using 43 parts by weight of a nylon 6(B) of which end groups are not modified having a relative viscosity of 2.9, with amino end groups of $4.6 \times 10^{-5}$ equivalent/g and carboxylic end groups of $5.3 \times 10^{-5}$ equivalent/g as the polyamide.

COMPARATIVE EXAMPLE 3

A film was molded in the same manner as Example 1 except for using 43 parts by weight of a nylon 6/66 copolymer (B) [having a weight ratio of constituent units of nylon 6 to nylon 66 (6/66) of 85/15, a melting point of 195° C. and a relative viscosity of 2.7, with amino end groups of $6.8 \times 10^{-5}$ equivalent/g and carboxylic end groups of $5.4\times10^{-5}$ equivalent/g] as the polyamide.

COMPARATIVE EXAMPLE 4

A film was molded in the same manner as Example 1 except for using 43 parts by weight of a nylon 6/66 copolymer (C) subjected to modification of end groups by m-xylenediamine [having a weight ratio of constituent units of nylon 6 to nylon 66 (6/66) of 85/15, a melting point of 195° C. and a relative viscosity of 2.6, with amino end groups of $8.5\times10^{-5}$ equivalent/g and carboxylic end groups of $5.1\times10^{-5}$ equivalent/g] as the polyamide.

COMPARATIVE EXAMPLE 5

A film was molded in the same manner as Example 1 except for using 43 parts by weight of a 6/12 copolymer (B) subjected to modification of end groups by m-xylenediamine [having an weight ratio of constituent units of nylon 6 to nylon 12 (6/12) of 80/20, a melting point of 196° C. and a relative viscosity of 2.6, with amino end groups of $6.7\times10^{-5}$ equivalent/g and carboxylic end groups of $3.1\times10^{-5}$ equivalent/g] as the polyamide.

The results of these Comparative Examples are shown in Table 1. In all of Comparative Examples 2, 3, 4 and 5, gels were generated after one to 2 hours' molding, and film preparation could be practiced with difficulty when molding was further continued.

COMPARATIVE EXAMPLE 6

A film was molded in the same manner as Example 2 except for changing the amount of the nylon 6/66 copolymer (A) in Example 2 to 3 parts by weight.

The results are shown in Table 1, from which it can be seen that the film obtained as described above was not substantially improved in pinhole resistance.

COMPARATIVE EXAMPLE 7

A film was molded in the same manner as Example 2 except for changing the amount of nylon 6/66 copolymer (A) in Example 2 to 230 parts by weight.

The results are shown in Table 1, from which it can be seen that the film obtained as described above was remarkably worsened in gas barrier property.

COMPARATIVE EXAMPLE 8

A film was molded in the same manner as Example 1 except for using 43 parts by weight of a 6/66 copolymer (D) subjected to modification of end groups by adipic acid [having a molar ratio of constituent units of nylon 6 to nylon 66 (6/66) of 85/15, a melting point of 195° C. and a relative viscosity of 2.8, with amino end groups of $2.2\times10^{-5}$ equivalent/g and carboxylic end groups of $9.5\times10^{-5}$ equivalent/g] as the polyamide.

As a result, gels were markedly generated during molding to make film preparation difficult.

EXAMPLE 6

A blend obtained by blending pellets of 100 parts by weight of an EVOH containing 38 mol % of the recurring units I based on ethylene monomer, a saponification degree of 99%, an intrinsic viscosity of 0.11 and a melting point of 173° C. formulated with 25% of glass fibers and 43 parts by weight of a nylon 6/66 copolymer (A) was used to mold test strips for tensile strength (ASTM D-638) and test strips for Izod impact test (ASTM D-256) by means of an injection molding machine at a cylinder temperature of 250° C. There was no generation of gelled products even when injection molding was conducted for a long time. For the test strips molded as described above, measurement was performed according to the ASTM standards. As the results, it was found that impact resistance was improved with an elongation at tensile break of 16% and an Izod impact strength notched of 9.4 Kg·cm/cm.

COMPARATIVE EXAMPLE 9

Test strips were injection molded in the same manner as Example 6 except for using no polyamide at all. The results of measurement for the test strips were that the elongation at tensile break was 9% and the Izod impact strength (notched) 6.8 Kg·cm/cm.

COMPARATIVE EXAMPLE 10

Test strips were injection molded in the same manner as Example 6 except for using 43 parts by weight of the nylon 6/66 copolymer (B) used in Comparative Example 3 in place of the nylon 6/66 copolymer (A) in Example 6. Generation of gelled product was found to begin at about 100 shots of molding (about one hour after initiation of molding), and molding could be hardly practiced due to the gelled product when molding was further continued.

TABLE 1

| | Polyamide used | | | Amount of polyamide formulated | Oxygen permeability | Pinhole resistance | | Gel |
| | | | | | | | | |
| | Kind of polyamide | Amino end group (equivalent/g) | Carboxy end group (equivalent/g) | Relative viscosity (—) | per 100 parts by wt. of EVOH (parts by weight) | (cc/m²/ 24 hrs) | Tensile modulus (Kg/cm²) | Elongation (%) | generation during molding |
|---|---|---|---|---|---|---|---|---|---|
| Example 1 | Nylon 6(A) | $9.7\times10^{-5}$ | $2.0\times10^{-5}$ | 2.7 | 43 | 1.0 or less | 20,800 | 357 | No gelation after 10 hours molding |
| Example 2 | Nylon 6/66 copolymer (A) | $9.0\times10^{-5}$ | $2.2\times10^{-5}$ | 2.8 | 43 | 1.0 or less | 19,800 | 380 | No gelation after 10 hours molding |
| Example 3 | Nylon 6/66 copolymer (A) | $9.0\times10^{-5}$ | $2.2\times10^{-5}$ | 2.8 | 11 | 1.0 or less | 22,700 | 205 | No gelation after 10 hours molding |
| Example 4 | Nylon 6/66 copolymer (A) | $9.0\times10^{-5}$ | $2.2\times10^{-5}$ | 2.8 | 100 | 3.8 | 15,700 | 408 | No gelation after 10 hours |

TABLE 1-continued

| | Polyamide used | | | Amount of polyamide formulated per 100 parts by wt. of EVOH (parts by weight) | Oxygen permeability (cc/m²/24 hrs) | Pinhole resistance | | Gel generation during molding |
| | Kind of polyamide | Amino end group (equivalent/g) | Carboxy end group (equivalent/g) | Relative viscosity (—) | | | Tensile modulus (Kg/cm²) | Elongation (%) | |
|---|---|---|---|---|---|---|---|---|---|
| Example 5 | Nylon 6/12 copolymer (A) | $10.5 \times 10^{-5}$ | $2.1 \times 10^{-5}$ | 2.5 | 43 | 1.0 or less | 18,600 | 360 | No gelation after 10 hours molding |
| Comparative example 1 | None | None | None | None | 0 | 1.0 or less | 24,100 | 58 | No gelation after 10 hours molding |
| Comparative example 2 | Nylon 6(B) | $4.6 \times 10^{-5}$ | $5.3 \times 10^{-5}$ | 2.9 | 43 | 1.0 or less | 15,200 | 350 | Gel generated after 1 hour molding |
| Comparative example 3 | Nylon 6/66 copolymer (B) | $6.8 \times 10^{-5}$ | $5.4 \times 10^{-5}$ | 2.7 | 43 | 1.0 or less | 19,500 | 403 | Gel generated after 1 hr molding |
| Comparative example 4 | Nylon 6/66 copolymer (C) | $8.5 \times 10^{-5}$ | $5.1 \times 10^{-5}$ | 2.6 | 43 | 1.0 or less | 19,600 | 391 | Gel generated after 1 hr molding |
| Comparative example 5 | Nylon 6/12 copolymer (B) | $6.7 \times 10^{-5}$ | $3.1 \times 10^{-5}$ | 2.6 | 43 | 1.0 or less | 18,400 | 365 | Gel generated after 2 hrs molding |
| Comparative example 6 | Nylon 6/66 copolymer (A) | $9.0 \times 10^{-5}$ | $2.2 \times 10^{-5}$ | 2.8 | 3 | 1.0 or less | 23,900 | 62 | No gelation after 10 hrs molding |
| Comparative example 7 | Nylon 6/66 copolymer (A) | $9.0 \times 10^{-5}$ | $2.2 \times 10^{-5}$ | 2.8 | 230 | 17.6 | 12,300 | 502 | No gelation after 10 hrs molding |
| Comparative example 8 | Nylon 6/66 copolymer (D) | $2.2 \times 10^{-5}$ | $9.5 \times 10^{-5}$ | 2.8 | 43 | 1.0 or less | 19,800 | 370 | Gel generated immediately after molding |

EXAMPLE 7

Pellets of 100 parts by weight of a EVOH containing 38 mol % of the recurring units I based on ethylene monomer, and having a saponification degree of 99%, an intrinsic viscosity of 0.14 and a melting point of 173° C. and pellets of 43 parts by weight of a nylon 6/66 copolymer subjected to modification of end groups by laurylamine [having a weight ratio of constituent units of nylon 6 to constituent units of nylon 66 (6/66) of 85/15, a melting point of 195° C. and a relative viscosity of 2.6, with a carboxylic end groups of $2.2 \times 10^{-5}$ equivalent/g and amino end groups of $7.5 \times 10^{-5}$ equivalent/g] (hereinafter referred to as a "polyamide A") were blended until to be uniform. The blend was fed into an extruder (T-die extruder, screw diameter=40 mm) and extruded by melting at 250° C. to extrude a film. Then, the extruded film was solidified by cooling on a casting drum with a surface temperature of 70° C. to mold a film with a thickness of about 50μ. For this film, evaluations of physical properties (1) to (4) were conducted. These results are shown in Table 2.

EXAMPLE 8

A film was molded in the same manner as Example 7 except for using 43 parts by weight of a nylon 6/66 copolymer subjected to modification of end groups by methylbenzylamine [having a weight ratio of constituent units of nylon 6 to constituent units of nylon 66 (6/66) of 85/15, a melting point of 195° C. and a relative viscosity of 3.2, with carboxylic end groups of $2.6 \times 10^{-5}$ equivalent/g and amino end groups of $5.3 \times 10^{-5}$ equivalent/g] (hereinafter referred to as "polyamide B") in place of polyamide A. For this film, the same tests as in Example 7 were conducted. The results are shown in Table 2.

EXAMPLE 9 and 10

A film was prepared in the same manner as Example 7 except for changing the amounts of the polyamide A in Example 9 to 11 parts by weight and in Example 10 to 100 parts by weight. For this film, the same tests as in Example 7 were conducted. The results are shown in Table 2.

EXAMPLE 11

A film was molded in the same manner as Example 7 except for using 43 parts by weight of a nylon 6/12 copolymer subjected to modification of end groups by laurylamine [having a weight ratio of constituent units of nylon 6 to constituent units of nylon 12 (6/12) of 80/20, a melting point of 196° C. and a relative viscosity of 2.8, with carboxylic end groups of $1.9 \times 10^{-5}$ equivalent/g and amino end groups of $5.9 \times 10^{-5}$ equivalent/g] in place of the polyamide A. For this film, the same tests as in Example 7 were conducted. The results are shown in Table 2.

EXAMPLE 12

A film was molded in the same manner as Example 7 except for using 43 parts by weight of a nylon 6/12 copolymer subjected to modification of end groups by laurylamine [having a weight ratio of constituent units of nylon 6 to constituent units of nylon 12 (6/12) of 60/40, a melting point of 150° to 160° C. and a relative viscosity of 2.5, with carboxylic end groups of $2.0 \times 10^{-5}$ equivalent/g and amino end groups of $5.8 \times 10^{-5}$ equivalent/g] in place of the polyamide A. For this film, the same tests as in Example 7 were conducted. The results are shown in Table 2.

As being apparent from Table 2, these films obtained in Examples 7 to 12 were each good in gas barrier property and improved in pinhole resistance. Also, no generation of gelled products were obserbed even after 10 hours molding.

COMPARATIVE EXAMPLE 11

A film was molded in the same manner as Example 7 except for using no polyamide at all and its physical properties were tested similarly. The results are shown in Table 2.

COMPARATIVE EXAMPLE 12

A film was molded in the same manner as Example 7 except for using 43 parts by weight of a nylon 6/66 copolymer of which end groups are not modified [having a weight ratio of constituent units of nylon 6 to constituent units of nylon 66 (6/66) of 85/15, a melting point of 195° C. and a relative viscosity of 2.9, with a carboxylic end groups of $5.2 \times 10^{-5}$ equivalent/g and amino end groups of $4.7 \times 10^{-5}$ equivalent/g]. Also, its physical properties were tested similarly. The results are shown in Table 2.

COMPARATIVE EXAMPLE 13

A film was molded in the same manner as Example 7 except for using 43 parts by weight of a nylon 6/12 copolymer subjected to modification of end groups by laurylamine [having a weight ratio of constituent units of nylon 6 to constituent units of nylon 12 (6/12) of 80/20, a melting point of 196° C., a relative viscosity of 2.8, with a carboxylic end groups of $3.4 \times 10^{-5}$ equivalent/g and amino end groups of $5.6 \times 10^{-5}$ equivalent/g]. Also, its physical properties were tested similarly. The results are shown in Table 2.

COMPARATIVE EXAMPLE 14

A film was molded in the same manner as Example 7 except for using 43 parts by weight of a nylon 6/12 copolymer subjected to modification of end groups by stearic acid [having a weight ratio of constituent units of nylon 6 to constituent units of nylon 12 (6/12) of 80/20, a melting point of 196° C. and a relative viscosity of 2.8, with carboxylic end groups of $8.8 \times 10^{-5}$ equivalent/g and amino end groups of $2.4 \times 10^{-5}$ equivalent/g] as a polyamide. Also, its physical properties were tested similarly. The results are shown in Table 2.

COMPARATIVE EXAMPLE 15 and 16

A film was molded in the same manner as Example 7 except for changing the amounts of the polyamide A in Example 15 to 3 parts by weight and in Example 16 to 230 parts by weight. Also, its physical properties were tested similarly. The results are shown in Table 2.

As apparent from Table 2, the physical properties of the films obtained in Comparative Examples 11 to 16 were not sufficient as shown below.

More specifically, concerning the gas barrier property, the films obtained in Comparative Examples 11 to 15 shown good values, but the value of the film obtained in Comparative Example 16 was considerably inferior. Concerning the pinhole resistance, the films obtained in Comparative Examples 11 to 15 were considerably inferior due to its hardness and small elongation. Concerning the generation of gelled product during molding, gelled product was generated after 1 hour molding in the film of Comparative Example 12 and was ganerated after 2 hours molding in the film of Comparative Example 13. Also, in Comparative Example 14, gelled product was generated immediately after molding to make film preparation difficult.

EXAMPLE 13

A blend obtained by blending pellets of 100 parts by weight of an EVOH containing 38 mol % of the recurring units I based on ethylene monomer, a saponification degree of 99%, an intrinsic viscosity of 0.11 and a melting point of 173° C. formulated with 25% of glass fibers and 43 parts by weight of a polyamide A was used to mold test strips for tensile strength (prepared according to ASTM D-638) and test strips for Izod impact test (prepared according to ASTM D-256) by means of an injection molding machine at a cylinder temperature of 250° C. There was no generation of gelled products even when injection molding was conducted for a long time. For the test strips molded as described above, measurement was performed according to the ASTM standards. As the results, it was found that impact resistance was improved with an elongation at tensile break of 14% and an Izod impact strength notched of 9.2 Kg·cm/cm.

COMPARATIVE EXAMPLE 17

Test strips were injection molded in the same manner as Example 12 except for using no polyamide at all. The results of measurement for the test strips were that the elongation at tensile break was 9% and the Izod impact strength (notched) 6.8 Kg·cm/cm.

COMPARATIVE EXAMPLE 18

Test strips were injection molded in the same manner as Example 13 except for using 43 parts by weight of the nylon 6/66 copolymer used in Comparative Example 12 in place of the polyamide A in Example 13. Generation of gelled product was found to begin at about 100 shots of molding (about one hour after initiation of molding), and molding could be hardly practiced due to the generation of the gelled product when molding was further continued.

TABLE 2

| | Oxygen permeability (cc/m²/24 hrs) | Pinhole resistance | | Gelling degree ($\eta_6/\eta$) | Gel generation during molding |
|---|---|---|---|---|---|
| | | Tensile modulus (Kg/cm²) | Elongation (%) | | |
| Example 7 | 1.0 or less | 19,700 | 391 | 1.5 | No gelation after 10 hours molding |
| Example 8 | 1.0 or less | 19,300 | 420 | 1.6 | No gelation after 10 hours molding |
| Example 9 | 1.0 or less | 22,600 | 207 | 1.3 | No gelation after 10 hours molding |
| Example 10 | 3.7 | 16,700 | 399 | 1.3 | No gelation after 10 hours molding |
| Example 11 | 1.0 or less | 18,400 | 373 | 1.4 | No gelation after 10 hours molding |
| Example 12 | 1.0 or less | 14,200 | 480 | 1.3 | No gelation after 10 hours molding |
| Comparative example 11 | 1.0 or less | 24,100 | 58 | 1.2 | No gelation after 10 hours molding |
| Comparative example 12 | 1.0 or less | 19,500 | 403 | 2.8 | Gel generated after 1 hour molding |
| Comparative example 13 | 1.0 or less | 18,500 | 364 | 2.4 | Gel generated after 2 hours molding |
| Comparative example 14 | 1.0 or less | 18,900 | 320 | 3.7 | Gel generated immediately after molding |
| Comparative example 15 | 1.0 or less | 24,000 | 69 | 1.7 | No gelation after 10 hours molding |
| Comparative example 16 | 18.0 | 12,800 | 495 | 1.7 | No gelation after 10 hours molding |

We claim:

1. A resin composition of a saponified product of an ethylenic copolymer, comprising 100 parts by weight of a saponified product of a copolymer of ethylene and vinyl acetate having 5 to 50 mol % of recurring units of —CH$_2$—CH$_2$— based on an ethylene monomer and a saponification degree of about 80% or more; and 5 to 150 parts by weight of a polyamide having a relative viscosity of 2.1 to 3.5, wherein said polyamide having been subjected to carboxylic end group modification with monoamine or diamine has a carboxylic acid end group amount of $3 \times 10^{-5}$ equivalent/g or less.

2. The resin composition of a saponified product of an ethylenic copolymer according to claim 1, wherein said saponified product of the copolymer of ethylene and vinylacetate has 10 to 45 mol % of the recurring units.

3. The resin composition of a saponified product of an ethylenic copolymer according to claim 1, wherein said saponification degree is 90% or more.

4. The resin composition of a saponified product of an ethylenic copolymer according to claim 1, wherein said saponified product of the copolymer of ethylene and vinyl acetate has an intrinsic viscosity of 0.07 to 0.17 in a solution of 15 wt. % water-containing phenol.

5. The resin composition of a saponified product of an ethylenic copolymer according to claim 1, wherein said saponified product of the ethylenic copolymer comprises 10 to 100 parts by weight of the polyamide.

6. The resin composition of a saponified product of an ethylenic copolymer according to claim 1, wherein said relative viscosity ranges from 2.1 to 3.2.

7. The resin composition of a saponified product of an ethylenic copolymer according to claim 1, wherein said polyamide is subjected to modification of end groups by a monoamine.

8. The resin composition of a saponified product of an ethylenic copolymer according to claim 1, wherein said polyamide is subjected to modification of end groups by a diamine.

9. The resin composition of a saponified product of an ethylenic copolymer according to claim 7, wherein said monoamine is an aliphatic or aromatic monoamine.

10. The resin composition of a saponified product of an ethylenic copolymer according to claim 8, wherein said diamine is an aliphatic or aromatic diamine.

11. The resin composition of a saponified product of an ethylenic copolymer according to claim 2, wherein said modification is carried out by adding the monoamine or the diamine during polymerization of the polyamide.

* * * * *